United States Patent [19]

Davister et al.

[11] Patent Number: 4,588,570
[45] Date of Patent: May 13, 1986

[54] METHOD FOR THE PREPARATION OF PHOSPHORIC ACID AND CALCIUM SULPHATE

[75] Inventors: Armand L. Davister, Liège; Andre R. Dubreuco, Saint-Georges; Francis A. Thirion, Liège, all of Belgium

[73] Assignee: Prayon Development, Engis, Belgium

[21] Appl. No.: 673,436

[22] PCT Filed: Mar. 13, 1984

[86] PCT No.: PCT/BE84/00008
§ 371 Date: Nov. 20, 1984
§ 102(e) Date: Nov. 20, 1984

[87] PCT Pub. No.: WO84/03690
PCT Pub. Date: Sep. 27, 1984

[30] Foreign Application Priority Data

Mar. 25, 1983 [LU] Luxembourg .......................... 84.713

[51] Int. Cl.$^4$ ............................................. C01B 25/16
[52] U.S. Cl. ..................................... 423/320; 423/166; 423/319; 423/321 R; 423/555
[58] Field of Search ............... 423/316, 317, 319, 320, 423/321 R, 321 S, 166, 167, 555

[56] References Cited

U.S. PATENT DOCUMENTS

| | | | |
|---|---|---|---|
| 1,836,672 | 12/1931 | Larssen | 423/166 |
| 3,416,887 | 12/1968 | Matsubara et al. | 423/167 |
| 3,632,307 | 1/1972 | Van Es et al. | 423/166 |
| 4,101,638 | 7/1978 | Inoue et al. | 423/320 |
| 4,136,151 | 1/1979 | Beaumont et al. | 423/319 |

FOREIGN PATENT DOCUMENTS

| | | |
|---|---|---|
| 430860 | 3/1970 | Australia. |
| 1534672 | 8/1968 | France. |
| 2320903 | 3/1977 | France. |
| 2409230 | 6/1979 | France. |
| 7909057 | 7/1981 | Netherlands. |

OTHER PUBLICATIONS

Chemical Abstracts, vol. 80, No. 16, 4/22/74 (Columbus, Oh.) p. 128, Abstract No. 85239j, JP, A, 4870094 (Okamura, et al).

*Primary Examiner*—Gregory A. Heller
*Attorney, Agent, or Firm*—Laff, Whitesel, Conte & Saret

[57] ABSTRACT

The present invention provides a continuous method for preparing phosphoric acid and calcium sulphate by reacting calcium phosphate with a mixture of sulphuric acid and phosphoric acid. Our method uses at least three successive crystallization steps: a first step of reacting the phosphate with the mixture of phosphoric and sulphuric acids and forming a-hemihydrate calcium sulphate, a second step of recrystallizing the a-hemihydrate into dihydrate and a third step of transforming the dehydrated calcium sulfate into a hemihydrate or anhydrite II or a mixture of the two. Where desired recycling of the products from the above steps can be used for increasing the efficiency of the above method.

33 Claims, 1 Drawing Figure

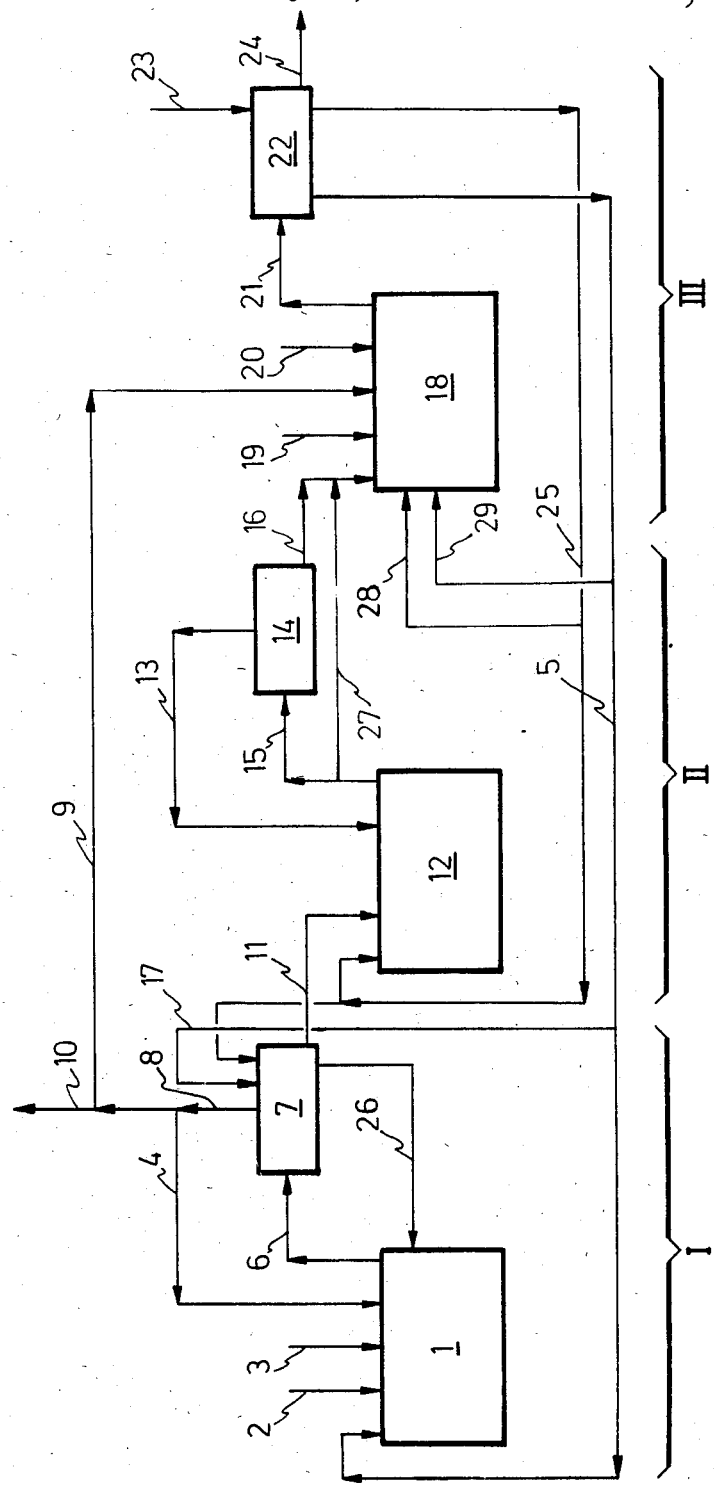

METHOD FOR THE PREPARATION OF PHOSPHORIC ACID AND CALCIUM SULPHATE

The present invention relates to a method for preparing phosphoric acid and calcium sulfate, notably as α-hemihydrate of calcium sulfate, II-anhydride of calcium sulfate, or a mixture of both these types of calcium sulfate, according to which calcium phosphate is subjected to an attack by a mixture of sulfuric and phosphoric acid.

Belgian Patent No. 638,739 relates to a method according to which the calcium sulfate is first precipitated under dihydrate form which is converted after removing the generated phosphoric acid, by increasing the temperature and acidity, into hemihydrate.

This known method has the advantage relative to the so-called "dihydrate" method, according to which the calcium sulfate is directly separated in the form of unusable gypsum, that the calcium sulfate thus obtained in hemihydrate form contains less than 0.15% $P_2O_5$ on dry material at 150° C., which brings a total extraction yield markedly higher than the one of the dihydrate method. Moreover a simple lime-neutralizing of the low free acidity contained in this hemihydrate makes it usable as such, for the plaster industry, and as setting regulator in the cement industry.

Indeed approximately five tons gypsum are produced for every ton $P_2O_5$ in the acid and for methods ending with an unsalable gypsum, this enormous amount gypsum has to be disposed of and stored in a suitable location, which consequently brings substantial expenses to cover the conveying, storage and pollution control costs.

Moreover as regards the possibility of using the residual hemihydrate produced according to the method described in Belgian Patent No. 638,739, other additional advantages may further be mentioned.

The hemihydrate produced by the method described in said Belgian Patent contains about 6.2% crystallizing water, while the dihydrate produced by other methods, such as the so-called "dihydrate" method; or resulting from a purifying operation contains about 20% crystallizing water. There results therefrom a lowering of the conveying costs and during the calcination, a lowering of the amount of water to be vaporized by about 0.166 tons per ton calcium sulfate, which thus brings a substantial energy saving, notably in the plaster industry and in the cement works, which require the calcination of the calcium sulfate to the hemihydrate or anhydrite state.

A second advantage of the hemihydrate method according to this Belgian Patent lies in the fact that by the natural re-hydrating to the expense of the accompanying moisture thereof, the hemihydrate which normally contains at the production, about 20 to 25% total water, is completely hydrated back after a stay of about three weeks on a storage area without any outside action and does only contain at this time, but about 5% moisture.

With respect to the gypsum produced with the dihydrate method for example, or resulting from a purifying operation, this re-hydrated product is dry and consequently very easy to handle, which lowers as much the conditioning and metering costs.

Finally a third advantage of the method according to this Belgian Patent relative to the dihydrate method lies in the fact that the obtained hemihydrate lies in the α-crystalline form, to the contrary of the hemihydrate produced by calcination of natural gypsum or phosphogypsum produced by the other known methods, which is present in the β-crystalline form. This feature is very advantageous because the α-hemihydrate has much better mechanical properties than β-hemihydrate. The β-hemihydrate can be converted into α-hemihydrate but by means of a costly process based on a discontinuous treatment inside an autoclave.

However according to the method described in this Belgian Patent, it is impossible to produce directly a phosphoric acid with a high $P_2O_5$ content.

Indeed the nefarious influence on the shape of the gypsum crystals, of the $P_2O_5$ content from the liquid phase, limits this latter one to 35% $P_2O_5$ approximately, and as most conventional uses of the phosphoric acid require 42 to 54% $P_2O_5$, it is necessary to concentrate the obtained acid to such content.

The production of one tone $P_2O_5$ into acid with 54% $P_2O_5$ from acid with 35% $P_2O_5$ requires the vaporizing of one ton water and it is thus possible to value the importance of methods which would directly produce phosphoric acid with very high $P_2O_5$ content, as regards the lowering of the energy consimption, and as regards the simplification and the lowering of the capital costs.

One of the essential objects of the present invention is to produce a new method for manufacturing phosphoric acid allowing on the one hand, to produce a phosphoric acid with high $P_2O_5$ content, while retaining the advantages of the method described in said Belgian Patent as regards the properties of the calcium sulfate as by-product.

For this purpose, the method according to the invention comprises at least three succeeding crystallizing steps, a first step according to which one subjects the phosphate to a reaction with said mixture of sulfuric and phosphoric acid under such conditions that the calcium sulfate crystallizes in α-hemihydrate, this hemihydrate being re-crystallized during a second step, into dihydrate by a modification of the temperature and acidity conditions, and the dihydrate thus obtained being converted during a third step, back into hemihydrate, into II-anhydrite or into a mixture of both these types, this calcium sulfate then being subjected to a separation operation, while the production phosphoric acid is removed during this first step.

Advantageously, at the end of the first step, one separates the hemihydrated calcium sulfate mixture from the produced phosphoric acid, one cycles part of this acid back to the attack of the calcium phosphate in this first step, one crystallizes in the second step the hemihydrated calcium sulfate back into dihydrated calcium sulfate, this dihydrated calcium sulfate obtained in the second step being contacted during the third step, with concentrated sulfuric acid and part of the phosphoric acid removed from the first step, the α-hemihydrate of calcium sulfate, the II-anhydrite of calcium sulfate or a mixture of both these types of calcium sulfate obtained during this third step, being in turn separated and the obtained liquid phase being cycled back to the attack of the phosphate calcium during the first step.

Other details and features of the invention will stand out from the description of a few particular embodiments of the invention method, given hereinafter by way of non limitative examples, with reference to the accompanying figure which shows diagrammatically an equipment for the working of this method.

According to the invention, one proceeds with at least three succeeding steps, in each one of which there is obtained a determined crystalline form of the calcium sulfate.

During a first step, one reacts natural calcium phosphate, sulfuric acid and cycled-back phosphoric acid, in such a way as to obtain a production phosphoric acid with high $P_2O_5$ content, notably from 38 to 50%, and preferably 43 to 45%, under such conditions that the calcium sulfate crystallizes in α-hemihydrate, this hemihydrate being relatively not-pure as regards the $P_2O_5$ proportion, due to the high phosphoric acid concentration in the medium.

The production acid is separated at this stage, by filtering or decanting for example, and the hemihydrate cake or pulp resulting from this separation operation is crystallized back into dihydrate, during a second step, by changing the temperature and acidity conditions. The dihydrate pulp thus obtained is then possibly subjected to a new separation operation allowing to provide a diluted phosphoric acid usable for the retaining of the solid percentage in this second step.

During a third step, by a new change of the temperature and acidity conditions, the dihydrate cake or pulp originating from the separation operation during the second step, is converted back to α-hemihydrate, to II-anhydrite or to a mixture of both these calcium sulfate types, and once more subjected to a separation operation, preferably by filtering. The cake of hemihydrate, II-anhydrite or α-hemihydrate+ II-anhydrite formed in the filter is then washed with water and comprises the final by-product. The filtrate is cycled back to the first step and the washing liquors are cycled back to the second step and/or to the first step.

More particularly, the reaction conditions in the first step, for the calcium sulfate to crystallize in α-hemihydrate form, are as follows: a temperature from 70° to 100° C., preferably 80° to 90° C., a $P_2O_5$ concentration in the liquid phase from 38 to 50%, preferably 43 to 45%, and a $H_2SO_4$ concentration in the liquid phase from 0.25 to 2.5%, preferably from 1 to 1.7%.

Thereafter, the conditions for obtaining the converting of the hemihydrate into dihydrate during the second step are as follows: a temperature from 40° to 80° C., preferably 50° to 70° C., a $P_2O_5$ concentration in the liquid phase from 15 to 34%, preferably 20 to 32%, and a $H_2SO_4$ concentration in the liquid phase from 0.5 to 17.5%, preferably from 4 to 14%.

Finally during the third step, the converting conditions for obtaining the crystallizing of the dihydrate back to α-hemihydrate, to II-anhydrite or to a mixture of these calcium sulfate types, are as follows: a temperature from 60° to 100° C., preferably 70° to 98° C., a $P_2O_5$ concentration in the liquid phase from 15 to 34%, preferably 20 to 30%, and a $H_2SO_4$ concentration in the liquid phase from 7 to 25%.

By a suitable selection of the operating conditions within the limits of temperature, $H_2SO_4$ concentration or $P_2O_5$ concentration as given hereinabove, it has advantageously been noted that it is possible to obtain during this third step, either relatively pure α-hemihydrate, or relatively pure II-anhydrite, or a mixture of α-hemihydrate and anhydrite, and this with any ratio.

Thus with a view to obtaining during the third step, essentially hemihydrated calcium sulfate, one retains the following converting conditions: a temperature from 78° to 100° C., a $P_2O_5$ concentration in the liquid phase from 22 to 34%, and a $H_2SO_4$ concentration in the liquid phase from 7 to 14%.

When to the contrary, it is essentially desired to obtain during this third step, II-anhydrite, one retains the following converting conditions: a temperature from 60 to 75%, a $P_2O_5$ concentration in the liquid phase from 15 to 18%, and a $H_2SO_4$ concentration in the liquid phase from 16 to 25%.

When finally, one tries to obtain during the third step, a mixture within some well-determined ratios of the hemihydrate and the II-anhydrite, one retains the following converting conditions: a temperature from 74° to 78° C., a $P_2O_5$ concentration in the liquid phase from 18 to 22%, and a $H_2SO_4$ concentration in the liquid phase from 14 to 17%.

To obtain a continuous and as homogenous as possible operation for the various reactions, in a particular embodiment of the invention object, the proportion of solids in the calcium sulfate pulp obtained after the separation from the liquid phase, is retained during the first step to 20 to 38%, preferably 26 to 32%, during the second step to 22 to 62%, preferably 26 to 58%; and during the third step to 20 to 34%, preferably from 24 to 30%.

On the other hand, the volume of the various reactors used and the relative flow rate through said latter ones in the three steps should be a function of the reaction rate for the crystallizing of the hemihydrate back into dihydrate and from dihydrate back into hemihydrate and/or anhydrite under the given temperature and concentration conditions.

It has thus been noted that a reaction time in the first step lying between 2 and 4 hours, a time for crystallizing the hemihydrate back to dihydrate in the second step lying between 4 and 16 hours, and a time for crystallizing the dihydrate back to hemihydrate and/or anhydrite in the third step comprised between 1 and 3 hours give satisfactory results.

The accompanying figure shows diagrammatically an equipment for the working of the method as described hereinabove.

This equipment comprises a hemihydrate reactor 1, which is comprised either of a single tank, or a set of reacting tanks, provided with a system for suitable mixing, stirring, circulating and cooling, not shown.

The phosphate and the sulfuric acid are fed to the reactor 1, as shown by arrows 2 and 3 respectively. This reactor 1 is connected through a line 6, to a separator 7, such as a filter or decanting device, inside which occurs the separation between the liquid phase and the formed hemihydrate.

The liquid phase forming the production phosphoric acid is discharged from this separator 7 through a line 8, on which is connected a line 4 allowing to cycle part of the produced acid back to the reactor 1, so as to control the solid percentage therein.

According to the invention, the separator 7 may possibly be washed by means of liquids produced downstream of filter 22 and collected by lines 17 and 25. The result of this washing is cycled back to the reactor 1 by line 26.

The hemihydrate cake or pulp formed in the separator 7 is fed as shown by a line 11, to a tank 12 for converting to dihydrate where occurs the converting of the hemihydrate to dihydrate. The dihydrate thus formed may either be fed as a whole to a separator 14, as shown by a line 15, or be fed directly to a converting tank, as shown by a line 27, or be partly fed to the separator 14 and partly fed directly to the tank 18. When the dihydrate pulp is fed as a whole or partly to the separator 14, the liquid phase is cycled back from this latter one through a line 13, to the reactor 12, with the purpose of controlling the proportion of solids therein.

The dihydrate cake or pulp coming out of the separator 14 is fed to the converting tank 18, as shown by a line 16. In this tank 18, one moreover adds concentrated sulfuric acid shown by the arrow 19, as well as steam as shown by the arrow 20, to increase the temperature therein.

Finally, the $P_2O_5$ and solid contents in the liquid phase inside the tank 18 are possibly adjusted by cycling back concentrated phosphoric acid originating from the first step, as shown by a line 9 and by cycling-back of the filter through the line 29.

Thereafter, the pulp of α-hemihydrate, II-anhydrite or a mixture of both calcium sulfate types is fed through a line 21 to a filter 22 where occurs a new liquid-solid separation.

The cake of α-hemihydrate, II-anhydrite or a mixture of both these calcium sulfate types is then washed by means of hot water, as shown by arrow 23, and discharged from filter 22, as shown by arrow 24.

The filtrate is cycled through a line 5 back to the reactor 1 with the purpose of retaining the $P_2O_5$ content in this reactor. The cake of α-hemihydrate, II-anhydrite or a mixture of both these calcium sulfate types is subjected before being discharged, as shown by arrow 24, to a washing and the washing filtrate may be fed to the converting tanks 12 and 18, and possibly to the separator 7, as shown by the line 25.

Some actual examples of the method according to the invention are given hereinafter, as applied in the equipment as shown in the accompanying figure.

EXAMPLE 1

A mixture of Kola-Togo phosphates with the ratio 1/1 has been fed to the reactor 1 with concentrated sulfuric acid at 99%, the percentage of solids in the reactor 1 has been controlled by the cycling-back of acid produced as shown by the line 4, while the $P_2O_5$ content of the liquid phase has been retained by cycling-back the filtrate 5 originating from the third step. The reaction conditions inside this reactor were as follows: temperature 85° C.; percentage of solids in the reaction pulp: 25%; percentage of $P_2O_5$ in the liquid phase: 43%, percentage of $H_2SO_4$ in the liquid phase: 1.2%. The calcium sulfate has precipitated in the form of hemihydrate $CaSO_4.\frac{1}{2}H_2O$ as macled crystals with a good filterability. The attack efficiency was 96.5% and the hemihydrate did contain about 1% total $P_2O_5$ in the solid phase, computed over dry at 250° C.

The hemihydrate cake in the separator 7 did contain about 25% accompanying liquid and has been fed to the tank 12 for converting to dihydrate where the temperature has been lowered to 60° C. by cooling, the percentage of solids has been brought back to 35% by cycling back liquors originating from the separation apparatus 14 and 22, and the $P_2O_5$ percentage in the liquid phase has been adjusted to 21.5% by cycling back liquors originating from the third step.

Inside reactor 18, the conditions for temperature, $H_2SO_4$ concentration, and $P_2O_5$ concentration have succeedingly been adjusted to obtain during a first test, essentially α-hemihydrate, during a second test, essentially II-anhydrite, and during a third test, a determined mixture of α-hemihydrate and II-anhydrite.

In the first test, the dihydrate has been converted back to hemihydrate by a raising of the temperature up to 85° C. and an increase of sulfuric acid concentration up to 9.5%, a solid content of 30% and a $P_2O_5$ content in the liquid phase of 30.7%.

The hemihydrate obtained at the outlet from tank 18 did contain but 0.15% $P_2O_5$, which meant an overall extraction efficiency for $P_2O_5$ from the phosphate of 99.5%.

Due to the size and the favourable shape of the crystals, the cake moisture was 19% and the filtering efficiency for $P_2O_5$ was 99.8%.

In the second test, the dihydrate has been converted to II-anhydrite by a raising of the temperature up to 73° C. and an increase in the sulfuric acid concentration up to 16%, a solid content of 28%, and a $P_2O_5$ content in the liquid phase of 18%.

The anhydrite obtained at the outlet from tank 18 did contain but 0.25% $P_2O_5$, which meant an overall extraction efficiency for $P_2O_5$ from the phosphate of 99%. The cake moisture was 25% and the filtering efficiency for $P_2O_5$ was 99.2%.

In the third test, the dihydrate has been converted to lime sulfate comprised of 80% α-hemihydrate and 20% II-anhydrite. For this purpose, the temperature has been raised to 80° C., the sulfuric acid concentration has been adjusted to 13%, while the $P_2O_5$ content has been retained at 27%. By way of variation, the $P_2O_5$ content has been adjusted to 23%, the sulfuric acid concentration to 15% and the temperature has been set at 78° C. These conditions have allowed to obtain lime sulfate comprised of 40% α-hemihydrate and 60% II-anhydriite.

EXAMPLE 2

A mixture of Kola-Marocco phosphates with a proportion of 70 parts Kola phosphates to 30 parts Marocco phosphates are reacted inside the reactor 1 in the following operating conditions: temperature: 94° C.; solid content in the reaction mixture: 28%; $P_2O_5$ content in the liquid phase: 45%, and $H_2SO_4$ content in the liquid phase: 1%. The attack efficiency was 94%, which meant that the hemihydrate did contain about 1.8% $P_2O_5$ in the solid phase, according to an analysis based on the dry solid weight at 250° C.

In the second step, the hemihydrate has been converted to dihydrate by lowering the temperature to 60° C.; the other operating conditions were: solid content in the mixture: 50%, and $P_2O_5$ content in the liquid phase: 22%.

In the third step, three succeeding tests also have been made, that is in tank 18 one has succeedingly prepared α-hemihydrate, II-anhydrite and a series of mixtures of both these crystalline forms.

Thus in a first test, the dihydrate has been converted back to hemihydrate by raising the temperature up to 82° C. and the sulfuric acid content has been raised up to 8.5%. The other operating conditions were: solid content in the mixture: 24% and $P_2O_5$ content in the liquid phase 24%.

In this test, the hemihydrate discharged at filter 22 was also present in α-crystalline form with a $P_2O_5$ content of 0.13% (based on a dry product at 250° C.) and with a moisture content of the cake of 20.2%.

In the second test, the dihydrate has been converted to II-anhydrite by a raising of the temperature up to 75° C. and a raising of sulfuric acid concentration up to 19%, a solid content of 26% and a $P_2O_5$ content in the liquid phase of 17%. The II-anhydrite obtained did contain but 0.28% $P_2O_5$, which corresponds to a total extraction efficiency for the $P_2O_5$ from the phosphate of 98.8%. The cake moisture was 24% and the filtering efficiency for $P_2O_5$ was 99%.

In the third test, by varying the $P_2O_5$ content within said limits, it was possible to convert the dihydrate to a mixture of hemihydrate and anhydrite the ratio of which did vary between a few percents to more than 90%.

EXAMPLE 3

Marocco phosphate 70-72 BPL is subjected in the reactor 1 to the following operating conditions: temperature 80° C., solid content in the reaction mixture: 24%, $P_2O_5$ content in the liquid phase: 43% and $H_2SO_4$ content in the liquid phase: 1%. The attack efficiency was 96.5%, which meant that the hemihydrate did contain about 1% $P_2O_5$ in the solid phase according to an analysis based on the dry solid weight at 250° C.

In the second step, the hemihydrate has been converted to dihydrate by lowering the temperature to 60° C.; the other operating conditions were: solid content in the mixture: 52%, and $P_2O_5$ content in the liquid phase: 18%.

As in both preceding examples, in the third step the conditions have been adapted to obtain separately -hemihydrate, II-anhydrite and mixtures of both these crystalline forms.

In the first test, the dihydrate has been converted to -hemihydrate at a temperature of 80° C. and a sulfuric acid content of 12%. The solid content in the mixture was 26% and the $P_2O_5$ content in the liquid phase was 26%. The hemihydrate discharged at filter 22 was present in the form of -hemihydrate and did contain 0.15% $P_2O_5$ (based on the dry product at 250° C.), the moisture content of the cake being 23%.

In the second test, the dihydrate has been converted to II-anhydrite. The conditions were as follows:
temperature: 72° C.
$H_2SO_4$ concentration: 20%
$P_2O_5$ content: 16% (liquid phase)
solid content: 28%
The anhydrite obtained did contain 0.90% $P_2O_5$, the total extraction efficiency for $P_2O_5$ was 98.6%. The cake moisture was 26% and the filtering efficiency for $P_2O_5$ was 99%.

In the third test, by retaining the $P_2O_5$ content between 18 and 23%, there was obtained a mixture of hemihydrate and II-anhydrite of calcium sulfate the anhydrite content of which did vary between 20 and 70%.

EXAMPLE 4

Florida phosphate 75 BPL is reacted in the reactor 1 in which the operating conditions were as follows: temperature: 85° C.; solid content in the mixture 26%, $P_2O_5$ content in the liquid phase 45%; $H_2SO_4$ in the liquid phase 1%.

The $P_2O_5$ content in the hemihydrate, based on the dry solid at 250° C., was 0.9% and therefor the attack efficiency was near 97%.

In the second step, the converting temperature did lie at 65° C., the solid content in the pulp was 50% and the $P_2O_5$ content in the liquid phase was 20%.

In the third step, for preparing α-hemihydrate, the converting temperature did lie at 85° C., the sulfuric acid content was 15%, the $P_2O_5$ content in the liquid phase was 24%.

The α-hemihydrate discharged at filter 22 did contain 0.12% $P_2O_5$ (based on dry solid at 250° C.) and the cake did contain about 22% moisture.

For the preparation of II-anhydrite, the temperature did lie at 72° C., the $H_2SO_4$ content at 21%, the solid content in the mixture was 26% and the $P_2O_5$ content in the liquid phase was 18%. The discharged anhydrite did contain 0.30% $P_2O_5$ (based on dry solid at 250° C.) and the cake did contain about 26.5% moisture.

Finally, a mixture of both these crystalline forms has been obtained by varying the operating conditions between these limits.

There results from said examples that it is quite possible to favourably modify the crystalline forms of the hemihydrate and the dihydrate by acting on the operating parmeters such as temperature, total acidity (phosphoric acid + sulfuric acid), ratio phosphoric acidity/sulfuric acidity, solid content, residence time in the reaction and converting tanks.

It has also been found that it is possible to modify favourably the crystallizing as well of the hemihydrates, the dihydrate, as of the anhydrite by correcting the possible unbalance of the phosphate with additions of active silica and/or compounds containing alumina, such as aluminum hydroxide or kaolin, in one or several point(s) in the circuit. Thus the method according to the invention may be applied, with substantially the same results, to the treatment of phosphates from a different origin than the ones used in said examples.

There should further be noticed that the concentrated phosphoric acid, produced by the method of the invention, originates from a reaction tank where the residence time is such that the various impurities originating from the starting phosphate, are balanced as regards the solubility thereof in the acidity and temperature conditions being considered.

Consequently there will be noticed, when storing this acid, markedly less subsequent precipitations than in the case of an acid produced by the so-called "dihydrate" conventional method, where the impurity balance in the acid with 27 to 30% $P_2O_5$ is broken during the concentration, by raising the temperature, up to 45 to 54% $P_2O_5$.

It is well understood that the invention is not limited to the described embodiment and that many variations may be considered within the scope of the present patent.

As reactor 1, the tanks 12 and 18 might of course also be comprised of a single tank or a set of tanks connected together.

It is to be noted that in the above description, the dihydrated calcium sulfate, the hemihydrated calcium sulfate, the II-anhydrite calcium sulfate or else the calcium sulfate dihydrate, the calcium sulfate hemihydrate and the calcium sulfate anhydrite, have generally been called respectively "dihydrate", "hemihydrate, "II-anhydrite".

We claim:

1. A continuous method for preparing phosphoric acid and calcium sulfate, by reacting calcium phosphate with a mixture of sulfuric and phosphoric acids, said method comprising at least three succeeding crystallizing steps, (a) a first step of reacting the phosphate with said mixture of sulfuric and phosphoric acids at a temperature of from 70° to 100° C., with a $P_2O_5$ concentration comprised between 38 and 50%, in the presence of sulfuric acid with a concentration of between 0.25 and 2.5%, to provide a solid content in the mixture of between 20 and 38%, and with a reaction time of between 2 and 4 hours, to produce α-hemihydrate calcium sulfate and separating the produced phosphoric acid therefrom; (b) a second step of reacting the hemihydrate at a temperature of from 40° to 80° C., changing the concentration in the liquid phase of $P_2O_5$ to between 15 and 35%, and of the sulfuric acid between 0.5 and 17.5%, with a solid content of between 22 and 62%, and a reaction time of between 4 and 16 hours, to obtain a dihydrated calcium sulfate; and (c) a third step of reacting the dihydrate at a temperature of from 60° to 100° C., retaining in the liquid phase a $P_2O_5$ content of from 15 to 34% and a sulfuric acid concentration of from 7 to 25%, and a solid content of between 20 and 34%, a reaction time from 0.5 to 3 hours to transform the dihydrate into a form selected from the group consisting of α-hemihydrate, II-anhydrite, and mixtures thereof.

2. The method according to claim 1, wherein the α-hemihydrate calcium sulfate being produced contains on dry basis at 250° C. from 5.8 to 6.1% crystal $H_2O$ and crystallized in the hexagonal system; the II-anhydrite calcium sulfate being produced containing on dry basis at 280° C. from 0.2 to 0.6% crystal $H_2O$ and crystallized in the orthorhombic system.

3. A method according to claim 1, wherein at the end of the first step a portion of the produced phosphoric acid is cycled back to react with the calcium phosphate in the first step and with the dihydrate of the third step and a portion of the obtained liquid phase of step three being cycled back to react with the calcium phosphate in the first step.

4. The method according to claim 2, wherein at the end of the first step a portion of the produced phosphoric acid is cycled back to react with the calcium phosphate in the first step and with the dihydrate of the third step and a portion of the obtained liquid phase of step three being cycled back to react with the calcium phosphate in the first step.

5. The method according to claim 1, wherein in the third step the temperature is from 78° to 100° C., the $P_2O_5$ concentration in the liquid phase is from 22 to 34%, and a $H_2SO_4$ concentration in the liquid phase is from 7 to 14% to obtain essentially hemihydrated calcium sulfate.

6. The method according to claim 2, wherein in the third step the temperature is from 78° to 100° C., the $P_2O_5$ concentration in the liquid phase is from 22 to 34%, and a $H_2SO_4$ concentration in the liquid phase is from 7 to 14% to obtain essentially hemihydrated calcium sulfate.

7. The method according to claim 3, wherein in the third step the temperature is from 78° to 100° C., the $P_2O_5$ concentration in the liquid phase is from 22 to 34%, and a $H_2SO_4$ concentration in the liquid phase is from 7 to 14% to obtain essentially hemihydrated calcium sulfate.

8. The method according to claim 1, wherein in the third step the temperature is from 60° to 75°, the $P_2O_5$ concentration in the liquid phase is from 15 to 18%, and the $H_2SO_4$ concentration in the liquid phase is from 16 to 25% to obtain essentially II-anhydrite of calcium sulfate.

9. The method according to claim 2, wherein in the third step the temperature is from 60° to 75°, the $P_2O_5$ concentration in the liquid phase is from 15 to 18%, and the $H_2SO_4$ concentration in the liquid phase is from 16 to 25% to obtain essentially II-anhydrite of calcium sulfate.

10. The method according to claim 3, wherein in the third step the temperature is from 60° to 75°, the $P_2O_5$ concentration in the liquid phase is from 15 to 18%, and the $H_2SO_4$ concentration in the liquid phase is from 16 to 25% to obtain essentially II-anhydrite of calcium sulfate.

11. The method according to claim 1, wherein in the third step the temperature is from 74° to 78° C., the $P_2O_5$ concentration in the liquid phase is from 18 to 22%, and the $H_2SO_4$ concentration in the liquid phase is from 14 to 17% to obtain a mixture of II-anhydrite and hemihydrate of calcium sulfate.

12. The method according to claim 2, wherein in the third step the temperature is from 74° to 78° C., the $P_2O_5$ concentration in the liquid phase is from 18 to 22%, and the $H_2SO_4$ concentration in the liquid phase is from 14 to 17% to obtain a mixture of II-anhydrite and hemihydrate of calcium sulfate.

13. The method according to claim 3, wherein in the third step the temperature is from 74° to 78° C., the $P_2O_5$ concentration in the liquid phase is from 18 to 22%, and the $H_2SO_4$ concentration in the liquid phase is from 14 to 17% to obtain a mixture of II-anhydrite and hemihydrate of calcium sulfate.

14. The method according to claim 1, wherein there is added to any of the steps a compound selected from the group consisting of active silica, aluminum hydroxide and kaolin.

15. The method according to claim 2, wherein there is added to any of the steps a compound selected from the group consisting of active silica, aluminum hydroxide and kaolin.

16. The method according to claim 3, wherein there is added to any of the steps a compound selected from the group consisting of active silica, aluminum hydroxide and kaolin.

17. The method according to claim 5, wherein there is added to any of the steps a compound selected from the group consisting of active silica, aluminum hydroxide and kaolin.

18. The method according to claim 8, wherein there is added to any of the steps a compound selected from the group consisting of active silica, aluminum hydroxide and kaolin.

19. The method according to claim 11, wherein there is added to any of the steps a compound selected from the group consisting of active silica, aluminum hydroxide and kaolin.

20. A continuous method for preparing phosphoric acid and calcium sulfate, according to which calcium phosphate is subjected to an attack by a mixture of sulfuric and phosphoric acids, said method comprising at least three succeeding crystallizing steps:

(a) a first of said steps attacking the phosphate with said mixture of sulfuric and phosphoric acids under the following reaction conditions: a temperature in the range of substantially 70° to 100° C.; a $P_2O_5$ concentration in the liquid phase comprising a range of approximately 38 to 50%, an $H_2SO_4$ concentration in the liquid phase comprising approximately 0.25–14%; and a reaction time between substantially two and four hours, so that the calcium sulfate crystallizes substantially in α-hemihydrate form; at the end of this first step, the produced phosphoric acid being separated from the hemihydrated calcium sulfate and a part of the separated acid being cycled back to the attack of the calcium phosphate;

(b) a second of said steps subjecting the hemihydrated calcium sulfate to the following modified reaction conditions: a temperature in the range of substantially 40° to 80° C.; a $P_2O_5$ concentration in the liquid phase of approximately 15 to 34%; an $H_2SO_4$ concentration in the liquid phase extending over the range between approximately 0.5 and 17.5%; a solid content in the calcium sulfate pulp being between substantially 22 and 62%; and a reaction time between approximately four and sixteen hours; so that the hemihydrate-α recrystallizes into substantially a dihydrate form; and (c) a third of said steps comprising contacting the obtained dihydrate with a concentrated sulfuric acid and another part of the phosphoric acid produced and extracted at the end of the first step; and agitating the formed pulp, under the following reaction conditions: a temperature in the approximate range between 60° and 100° C.; concentrating a $P_2O_5$ in the liquid phase from approximately 15 to approximately 34%; concentrating an $H_2SO_4$ in the liquid phase from approximately 7 to approximately 25%; a solid content between 20 and 34% and a reaction time of between approximately 0.5 and three hours; combining these reaction conditions to transform the dihydrate into one of hemihydrate α, anhydrite II, or into a mixture of hemihydrate α and anhydrite II, to obtain calcium sulfate during this third step which is subjected to a separation of the liquid phase which is cycled back to at least one of the preceding steps.

21. The method of claim 20 wherein the $H_2SO_4$ concentrate in the first step is in the range of 0.25-2.5%.

22. The method according to claim 20, wherein the dihydrated calcium sulfate obtained at the end of the second step is transferred to the third step substantially without previously separating the liquid phase.

23. The method according to claim 21 wherein the first step has the following reaction conditions: a temperature from 80° to 90° C., a $P_2O_5$ concentration in the liquid phase from 43 to 45%, and an $H_2SO_4$ concentration in the liquid phase from 1 to 7%.

24. The method according to claim 21 wherein the second step has the following converting conditions: a temperature from 50° to 70° C., a $P_2O_5$ concentration in the liquid phase from 20 to 32%, and a $H_2SO_4$ concentration in the liquid phase from 4 to 14%.

25. The method according to claim 21 wherein the third step has the following converting conditions: a temperature from 70° to 98° C., and a $P_2O_5$ concentration in the liquid phase from 20 to 30%.

26. The method according to claim 21 wherein the third step obtains essentially hemihydrated calcium sulfate, by using the following converting conditions: a temperature from 78° to 100° C., a $P_2O_5$ concentration in the liquid phase from 22 to 34%, and an $H_2SO_4$ concentration in the liquid phase from 7 to 14%.

27. The method according to claim 25 wherein the third step obtains essentially II-anhydrite of calcium sulfate, by using the following converting conditions: a temperature from 60° to 75° C., a $P_2O_5$ concentration in the liquid phase from 15 to 18%, and an $H_2SO_4$ concentration in the liquid phase from 16 to 25%.

28. The method according to claim 25 wherein the third step obtains a mixture of II-anhydrite and hemihydrate of calcium sulfate, by using the following converting conditions: a temperature from 74° to 78° C., a $P_2O_5$ concentration in the liquid phase from 18 to 22%, and an $H_2SO_4$ concentration in the liquid phase from 14 to 17%.

29. The method according to claim 22 wherein the first step has the following reaction conditions: a temperature from 80° to 90° C., a $P_2O_5$ concentration in the liquid phase from 43 to 45%, and an $H_2SO_4$ concentration in the liquid phase from 1 to 7%.

30. The method according to claim 22 wherein the second step has the following converting conditions: a temperature from 50° to 70° C., a $P_2O_5$ concentration in the liquid phase from 20 to 32%, and an $H_2SO_4$ concentration in the liquid phase from 4 to 14%.

31. The method according to claim 22 wherein the third step has the following converting conditions: a temperature from 70° to 98° C., and a $P_2O_5$ concentration in the liquid phase from 20 to 30%.

32. The method according to claim 2 wherein the solid content in the calcium sulfate pulp which is obtained after the separation of the liquid phase is maintained during the first step from 26 to 32%, during the second step from 26 to 58%, and during the third step from 24 to 30%.

33. The method according to claim 21 wherein the solid content in the calcium sulfate pulp which is obtained after the separation of the liquid phase is maintained during the first step from 26 to 32%, during the second step from 26 to 58%, and during the third step from 24 to 30%.

* * * * *

UNITED STATES PATENT AND TRADEMARK OFFICE
CERTIFICATE OF CORRECTION

PATENT NO. : 4,588,570
DATED     : May 13, 1986
INVENTOR(S) : Armand L. Davister, et al It is certified that error appears in the above-identified patent and that said Letters Patent is hereby corrected as shown below:

In the Abstract:

Lines 7 and 8, change "2-hemihydrate" to

-- $\alpha$ -hemihydrate--.

Line 9, change "dehydrated calcium" to --dihydrate calcium--.

Signed and Sealed this

Ninth Day of September 1986

[SEAL]

Attest:

DONALD J. QUIGG

Attesting Officer   Commissioner of Patents and Trademarks

UNITED STATES PATENT AND TRADEMARK OFFICE
CERTIFICATE OF CORRECTION

PATENT NO. : 4,588,570

DATED : May 13, 1986

INVENTOR(S) : Davister, et al.

It is certified that error appears in the above-identified patent and that said Letters Patent is hereby corrected as shown below:

In the Inventors:

Change "Andre R. Dubreuco" to --Andre R. Dubreucq--;

In the Assignee:

Change "Prayon Development" to --Prayon Developpement--.

Signed and Sealed this

Third Day of February, 1987

Attest:

DONALD J. QUIGG

Attesting Officer

Commissioner of Patents and Trademarks